United States Patent [19]

Lawton

[11] 4,097,288

[45] Jun. 27, 1978

[54] HEAT SENSITIVE RECORDING COMPOSITION CONTAINING A COMPLEXED PHENOLICS AND A SPIROPYRAN OR LEUCO LACTONE

[76] Inventor: William R. Lawton, 6651 Jewett-Holmwood Rd., Orchard Park, N.Y. 14127

[21] Appl. No.: 772,084

[22] Filed: Feb. 25, 1977

[51] Int. Cl.$^2$ .............................................. C09D 11/00
[52] U.S. Cl. ..................................... 106/21; 428/913; 96/90 R; 96/90 PC; 252/1
[58] Field of Search ........... 428/913; 96/90 R, 90 PC, 96/91 R, 92, 75; 252/1; 106/21

[56] References Cited

U.S. PATENT DOCUMENTS

| | | | |
|---|---|---|---|
| 2,663,654 | 12/1953 | Miller et al. | 96/92 |
| 3,076,707 | 2/1963 | Lawton et al. | 96/75 |
| 3,149,991 | 9/1964 | Baumann et al. | 428/913 |
| 3,149,992 | 9/1964 | Lawton | 96/75 |
| 3,445,261 | 5/1969 | Talvalkar | 428/913 |
| 3,674,535 | 7/1972 | Blose et al. | 428/913 |
| 3,825,432 | 7/1974 | Futaki et al. | 106/21 |
| 3,895,173 | 7/1975 | Adachi | 428/913 |
| 3,964,911 | 6/1976 | Robillard | 96/90 PC |

*Primary Examiner*—Won H. Louie, Jr.
*Attorney, Agent, or Firm*—Kegan, Kegan & Berkman

[57] ABSTRACT

A heat-sensitive recording composition containing normally colorless lactones or spiropyran compounds in combination with hydrogen bonded molecular complexes of phenolic compounds having a dissociation temperature ranging from 50° to 220° C. The composition of the invention is less sensitive to pressure and less susceptible to background staining, image flooding, moisture sensitivity, odor, railroading and burnout problems as compared with compositions in which phenolic compounds are not complexed.

13 Claims, No Drawings

HEAT SENSITIVE RECORDING COMPOSITION CONTAINING A COMPLEXED PHENOLICS AND A SPIROPYRAN OR LEUCO LACTONE

BACKGROUND OF THE INVENTION

This invention relates to a record member which changes or develops color when contacted with heated styluses, heated print heads of thermal printers, or infrared absorbing text when exposed through a thermal copier.

Many types of heat sensitive recording materials are well known. This invention is concerned with the improvement of thermal color forming recording materials containing a leuco or colorless form of a dye material and a phenolic material which reacts with the leuco material to form the colored dye. There are many systems of this type represented in the patent literature.

References for these systems include:
(1) Phthalides, naphthalides, fluorans

Typical of these are Crystal Violet Lactone or 3,3-bis-(p-dimethylaminophenyl)-6-dimethylamino phthalide and malachite green lactone or 3,3-bis (p-dimethylaminophenyl) phthalide. The reactions of these and many related phthalides with phenolics are described in Adachi, U.S. Pat. Nos. 3,895,173; Schwab, 3,322,557; Kohmura et al., 3,859,112; Hayashi et al., 3,773,542; Futaki et al., 3,846,153; Baum, 3,539,375; Shimazu, 3,864,684; Adachi et al., 3,843,384; Futaki et al., 3,829,401; Futaki et al., 3,825,432; Higachi, et al., 3,816,838; Nagashima et al., 3,792,481; Blose et al., 3,746,675.

Typical examples of the lactones which are listed in the patents as reacting with phenolic materials to produce a color include the following:

TABLE I 3,3-bis(p-dimethylaminophenyl)-6-dimethylaminophthalide
3,3-bis(p-dimethylaminophenylphthalide)
3,3-bis[p-di(n-butylaminophenyl)phthalide]
Rhodamine lactone
3-[2-methyl-4-(diethylamino)phenyl]-3-(1,2-dimethyl-3-indolyl)phthalide
3-(p-dimethylaminophenyl)-3-(1-ethyl-2-methyl-3-indolyl)-4,5,6,7-tetrachlorophthalide
3,3-bis(1-ethyl-2-methylindol-3-yl)phthalide
3-(4-morpholinophenyl)-3-(1,2-dimethylindol-3-yl)-4,5,6,7-tetrachlorophthalide
3-(1-benzyl-2-methylindol-3-yl)-8-(methyl-2-methylindol-3-yl)phthalide
5-nitro-3,3-bis(4-dimethylaminophenyl)phthalide
5-amino-3,3-bis(4-dimethylaminophenyl)phthalide
5-benzoylamino-3,3-bis-(4-dimethylaminophenyl)phthalide
3,3-bis(p-dimethylaminophenyl)-4,5,6,7-tetrachlorophthalide
3,3-bis(p-diethylaminophenyl)-6-dimethylaminophthalide
3,3-bis(p-dimethylaminophenyl)-6-aminophthalide
3,3-bis(p-dimethylaminophenyl)-6-(p-toluenesulfonamide) phthalide
3,3-bis(p-dimethylaminophenyl)-6-nitrophthalide
3,3-bis(p-dimethylaminophenyl)-6-monethylaminophthalide
3,3-bis(p-dimethylaminophenyl)-6-chlorophthalide
3,3-bis (p-dimethylaminophenyl)-6-ethoxyphthalide
3,3-bis(p-dimethylaminophenyl)-6-diethylaminophthalide
3-(4-diethylaminophenyl)-3-(1,2-dimethylindol-3-yl) naphthalide 3-(4-diethylaminophenyl)-3-(1-phenyl-pyrrol-3-yl) naphthalide
3-diethylamino-7-dibenzylaminofluoran
3-diethylamino-7-(N-methylanilino)fluoran
3-dimethylamino-6-methoxyfluoran
3-diethylamino-6-methyl-7-chlorofluoran
3-diethylamino-7-phenylfluoran
3-morpholino-5,6-benzofluoran
7-acetamino-3-dimethylaminofluoran
3-dimethylamino-5,7-dimethylfluoran
3,6-bis-β-methoxyethoxyfluoran
3,6-bis-β-cyanoethoxyfluoran
1-amino-3,6,7-trimethylfluoran
3-dibutylamino-6-methyl-7-chlorofluoran
3-diethylamino-7-dibenzylaminofluoran
3-diethylamino-7-(N-methyl-p-toluidino)fluoran
3-dimethylamino-7-chlorofluoran
3-(diethylamino)-6-methyl-7-anilinofluoran
3,7-bis(diethylamino)fluoran
3,6-dimethoxyfluoran
3-diamylamino-6-chlorofluoran
2',6'-bis(diethylamino)fluoran
2'-(benzylamino)-6'-(diethylamino)-3',4''-benzofluoran
3-(ethyl-p-tolylamino)-7-(methylphenylamino)fluoran
3-cyclohexylamino-6-chlorofluoran
3-diethylamino-5-methyl-7-bis(4-methylbenzyl)aminofluoran
3-diethylamino-6-methyl-7-(p-butylanilino)fluoran
2'-anilino-6'-diethylamino-3'-methylfluoran
3-(diethylamino)-7-(N-methylanilino)fluoran
2'-phenylamino-3'-methyl-6'-(N-ethyl-N-p-tolylamino) fluoran
3-diethylamino-7-piperidinofluoran
3-diethylamino-5-chloro-7-piperidinofluoran
3-dimethylamino-5-methyl-7-piperidinofluoran
3-diethylamino-5-methyl-7-piperidinofluoran
2-(2',4',6'-trimethylphenylamino)-8-diethylamino-3,4-benzofluoran
2,8-bis(N-ethyl-N-p-tolylamino)-fluoran
3-diethylamino-6-methyl-7-o-anisidinofluoran
3-(diethylamino)-6,7-dimethylfluoran
3-dimethylamino-5-methyl-7-[bis-(4-methylbenzyl)amino] fluoran
4-amino-8 [bis-β-ethoxyethyl)amino] benzofluoran
N,N'-bis (3'-diethylaminofluoran-7'yl) piperazine
2-phenylamino-6-diethylaminofluoran
2-phenylamino-6-dimethylaminofluoran
3'-diethylamino-7'-methylthiofluoran
3,7-bis (diethylamino)-5,6-benzofluoran
3-dimethylamino-7-benzylamino-5,6-benzofluoran
3-diethylamino-7-(N-benzyl-N-phenyl)aminofluoran
3-benzylamino-7-diethylaminofluoran
2'-(p-chloroanilino)-6'-diethylaminofluoran
2'-(m-chloroanilino)-3-methyl-6'-diethylaminofluoran
2'-(p-chloro-N-methylanilino)-6'-diethylaminofluoran
3-(diethylamino)-5-methyl-7-(β-phenylhydrazino)fluoran
3-(diethylamino)-7-bis(1-naphthylmethyl)aminofluoran
3-(diethylamino)-7-(2-phthalimidino)fluoran
3-diethylamino)-6-methyl-3'-azafluoran
3 -diethylamino-5-methyl-7-(diphenylamino)fluoran
3-(dimethylamino)-7-(diphenylmethylamino)fluoran
3-(diethylamino)-6-methyl-7-(p,p'-dimethyldiphenylmethyl)amino fluoran
3-(dibutylamino)-7-(diphenylmethylamino)fluoran 3-(diethylamino)-7-(β,β-dibenzylhydrazino)fluoran
3-(dimethylamino)-7-(p-methoxybenzamido)fluoran
7-anilino-3-(diethylamino)fluoran
2'-(methylphenylamino-6'-(methyl-p-tolylamino)fluoran
2'-methyl-6'-cyclohexylaminofluoran
2'-amino-6'-diethylamino-3'-methylfluoran
2'-amino-6'-diethylaminofluoran
2'-(2-carboxyanilino)-6'-diethylaminofluoran
3-dibenzylamino-7-diethylaminofluoran
2'-[N-(carboethoxymethyl)amino]-6'-diethylaminofluoran
2'-[N-(carbethoxymethyl)-N-methylamino]-6'-diethylaminofluoran
Rhodamine lactam
N-phenyl Rhodamine lactam
Rhodamine anilino lactam
9-p-nitroamino-3,6-bis(diethylamino)-9-Xanthenoyl-6-benzoic acid lactam
9-p-nitroamino-3,6-bis(dimethylamino)-9-thioxanthenoyl-6-benzoic acid lactam (2) Spiropyrans The following are some of the patents which list typical spiropyrans giving a color when reacted with phenolic materials: Talvakar, U.S. Pat. Nos. 3,445,261; Futaki et al., 3,829,401; Kohmura et al., 3,859,112; Hayashi et al., 3,773,542; Kimura et al., 3,666,525; Yahagi et al., Japanese Pat. No. 73-63,734; Futaki et al., Germany Pat. No. 2,252,845; Komura et al., German Pat. No. 2,327,135; Takamizawa et al., Japanese Patent No. 74-00,069; Robillard et al., French Pat. No. 2,204,151; Haino et al., Japanese Pat. No. 75-01,746; Samat et al., German Pat. No. 2,522,877; Miyazawa et al., Japanese 75-137,146; Takimoto et al., Japanese Pat. No. 75-152,742; Futaki et al., German Pat. No. 2,252,845; Miyazawa et al., Japanese Pat. No. 75-137,549.

Typical examples of the spiropyrans listed in the patents as reacting with phenolic materials to yield colored dyes include:

TABLE II

6'-chloro-8'-methoxybenzoindolinospiropyran
benzothiazolinospiropyran
benzo-β-naphthospiropyran
3-methyl-di-β-naphthospiropyran
1,3,3-trimethyl-6'-chloro-8'-methoxyindolinobenzospiropyran
6'chloro-8'-methoxyindolinobenzospiropyran
6-chloro-8-methoxy-1',3',3'-trimethylspiro(1-benzopyran-2,2'-indoline)
spiro (1-benzopyran-2,2'-naphthopyran)
8'-methoxybenzoindolinospiropyran
1,3,3-trimethyl-4,7,8'-trimethoxy [(2'H-1'-benzopyran)-2,2'-indoline]
6-chloro-8'-methyl-1,3,3-trimethylbenzoindolinospiropyran
2-ethyl-3,3'-spirobinaphthopyran
3-phenyl-di-β-naphthospiropyran
di-62 -naphthospiropyran
3-ethyl-di-β-napththospiropyran
3,3'-dichlorospirodinaphthopyran
1,3,3-trimethyl-6'-nitrospiro(2'H-1'-benzopyran-2,2'-indoline)
1,3,3-trimethyl-8'-nitrospiro(2'H-1'-benzopyran-2,2'-indoline)
1,3,3-trimethyl-6'-nitro-8'-methoxyspiro(2'H-1'-benzopyran-2,2'-indoline)
1,3,3-trimethyl-5'-nitro-8'-methoxyspiro(2'H-1'-benzopyran-2,2'-indoline)
3,7-bis(3',6'-dimethoxy-9'-spiroxanthyl) pyromellitide Typical examples of phenolic materials listed in the patent literature as reacting with the leuco compounds such as the phthalides, naphthalides, fluorans, and spiropyrans to form colored dyes include:

TABLE III 4,4'-isopropylidene diphenol
4,4'-isopropylidene-bis(2-methylphenol)
4,4'-isopropylidene bis(2-phenylphenol)
4,4'-isopropylidene-bis(2-t.butylphenol)
4,4'-sec.butylidene-diphenol
4,4'-sec.butylidene bis (2-methylphenol)
4,4'-cyclohexylidene diphenol
4,4'-cyclohexylidene-bis(2-isopropylphenol)
4,4'-ethylidene-diphenol
2,2'-methylenebis (5-methylphenol)
4,4'-ethylidene bis(2-methylphenol)
4,4'-(1-methylpentylidene)diphenol
4,4'-(methylisopentylidene)diphenol
4,4'-(1-methylhexylidene)diphenol
4,4'-(1-ethylbutylidene)diphenol
4,4'-(ethylpropylidene)-bis(2-methylphenol)
4,4'-isopropylidenedicatechol
4,4'-benzylidene-diphenol
4,4'-isopropylidene-bis(2-chlorophenol)
2,2'-dihydroxydiphenyl
2,2'-methylenebis (4-chlorophenol)
2,2'-methylene bis(4-methyl-6-t.butylphenol)
2,2'-methylene bis (4-methyl-6-t.butylphenol)
4,4'-isopropylidene bis (2,6-dimethyl phenol)
2,2'-thiobis (4,6-dimethylphenol)
4,4'-ethylene diphenol
4,4'-(1-methylbenzylidene)diphenol
4-t. butylphenol
4-phenylphenol
α-naphthol
β-naphthol
hydroquinone
pyrocatechol
pyrogallol
phloroglucine
m. cresol There are a number of commercial products which use the above-described combinations of leuco dyes and phenolic derivatives. These have found applications in thermal copying paper using 3M's Thermofax and other models of thermal copiers. Thermally responsive sheets using these materials have also been used with computer-driven thermal printers such as Texas Instrument's Silent 700 Thermal Printer. Sensitized papers containing a combination of leuco dyes and phenolic materials are used in chart recording instruments wherein a colored trace record is obtained by contacting the paper with a hot pen or stylus. There are certain inherent disadvantages found with the leuco dye-phenolic combinations. Complaints are received on background staining, fading of the record mark, flooding of the image, moisture sensitivity, odor, pressure sensitivity causing accidental marking by paper clips and the like, railroading (developing two bars or streaks on the path made by a hot stylus), and burnout on chart recording papers. Many of the phenolic materials described in the patents are toxic or irritating and cannot be used. These same leuco dye-phenolic color-forming systems are used in the "carbonless" pressure marking papers and the reactants are kept separate by microencapsulation or by being contained in separate layers. Pressure contact of these materials results in dye formation. This property is also inherent in the thermal papers and excess pressure will cause accidental marking. Also, for this same reason, the reactants must be ground separately and a solvent or resin binder-solvent combination which will dissolve or partially dissolve one or both of the co-reactants will result in premature dye formation in the coating mix. The object of this invention is to eliminate or minimize the problems incurred with the leuco dye-phenolic thermal color-reacting systems. Another objective is to minimize the sublimation or migration of the phenolic material which has caused problems with staining and change in sensitivity. Still another objective is the manufacture of thermal record sheets with improved image sharpness and definition.

SUMMARY OF THE INVENTION

I have found that the above objectives can be obtained by combining a leuco dye lactone or spiropyran with a phenolic material which has been inactivated by complexing. More specifically, the phenolic material is incorporated as the solid, particulate hydrogen bonded molecular complex of an amine or amide. The phenolic hydroxyls are non-reactive in the hydrogen bonded form, but become active and enter into a color-forming reaction with the leuco dye or dye precursor when heated to a temperature sufficient to dissociate the hydrogen bonded molecular complex into its original components. The complex can be dissociated by heat or by solution in a solid polar material when it is melted. The dissociation temperature of the complex can range from 50° to 220° C, but remains in a stable, unreactive form below 50° C.

Certain additives may be used with the recording composition of the invention to lower the temperature of color formation and to increase the intensity of color.

DETAILED DESCRIPTION OF THE INVENTION

Preparation of Complexes

The phenolic material is dissolved in anhydrous methanol or ethanol to form a 25 percent solution. The hydrogen bonding co-reactant amine or amide is added to the alcoholic solution of the phenolic derivative in molecular equivalents corresponding to the functional hydroxyl groups in the phenolic compound. For example, two moles of cyclohexylamine are added to one mole of a bis-phenol, one mole of amine is added to one mole of a mono-hydroxy compound, etc. The mixtures are stirred for a few minutes until they become homogeneous. In some cases, a solid complex will form and precipitate almost immediately, while others must be chilled in a cold box before solid products are obtained. The mixture containing the precipitated complex is then filtered and the precipitate is washed with alcohol and allowed to dry. The following table (Table IV) contains a number of hydrogen-bonded phenolic complexes which have been prepared in this manner.

Preparation of Coatings

The phenolic hydrogen bonded complexes are dispersed in a solution of a binder and ball-milled or otherwise comminuted until a fine particle size, preferably below 10 microns, is obtained. Any solvent-binder system may be used which does not dissolve and dissociate the phenolic complex. Some suitable systems include water solutions of polyvinyl alcohol, hydroxyethyl cellulose, and other common water-soluble polymeric resins. Methanol or ethanol solutions of nitrocellulose, ethylcellulose, and other alcohol-soluble resins can be used.

TABLE IV

AROMATIC HYDROXY COMPLEXES

| Phenol | Amine | Dissociation Temp.° C |
|---|---|---|
| p,p' biphenol | ethylene diamine | 136-140 |
| " | t.butyl amino ethyl methacrylate | |
| Bisphenol B | ethylenediamine | 85-92 |
| " | formamide | 64-66 |
| " | t.butyl aminoethyl methacrylate | 94-6 |
| 4,4'-isopropylidene bis (2-isopropylphenol) | triethanolamine | 60-63 |
| " | ethylene diamine | 100-4 |
| 4,4'-isopropylidene bis (2,6-dibromophenol) | diethanol amine | 107-145 |
| " | triethanolamine | 128-157 |
| " | ethylene diamine | 198-215 |
| " | diethylenetriamine | 210-215 |
| " | propylene diamine | 146-156 |
| " | formamide | 95-102 |
| " | hydrazine | 135-150 |
| " | t.-butyl aminoethyl methacrylate | 130-5 |
| 4-hydroxy propiophenone | hydrazine | 84-90 |
| 2,4-dichloro-6-phenylphenol | ethyleneiamine | 100-4 |
| " | diethylenetriamine | 115-20 |
| " | propylenediamine | 92-4 |
| 2,2'-methylenebis (3,4,6-trichlorophenol) (Hexachlorophene) | diethanolamine | 75-8 |
| " | triethanolamine | 118-23 |
| " | ethylenediamine | 124-7 |
| " | diethylenetriamine | 90-110 |
| " | propylene diamine | 125-30 |
| " | formamide | 125-30 |
| " | hydrazine | 180-4 |
| " | t-butylamine ethyl methacrylate | 123-6 |
| 2-bromo-4-phenyl phenol | ethylenediamine | 66-8 |

TABLE IV-continued
AROMATIC HYDROXY COMPLEXES

| Phenol | Amine | Dissociation Temp. °C |
|---|---|---|
| " | diethylene triamine | 78–82 |
| " | formamide | 55–8 |
| p-phenyl phenol | ethylene diamine | 137–43 |
| " | diethylene triamine | 99–104 |
| " | propylene diamine | 77–81 |
| " | formamide | 90–5 |
| " | hydrazine | 145–150 |
| 2,2'-thiobis (4,6-dichlorophenol) (Actomer) | triethanolamine | 120–5 |
| " | ethylene diamine | 125–130 |
| " | diethylene triamine | 158–164 |
| " | propylene diamine | 142–5 |
| " | formamide | 115–25 |
| " | hydrazine | 195–200 |
| 4,4' isopropylidenebis (2,6-dichlorophenol) (Tetrachlorobisphenol A) | ethylenediamine | 192–5 |
| " | diethylene triamine | 210–15 |
| " | propylene diamine | 170–5 |
| " | formamide | 100–5 |
| " | hydrazine | 142–6 |
| " | t-butyl amine ethyl methacrylate | 132–5 |
| 5-chloro-2-hydroxy benzophenone | ethylene diamine | 190–4 |
| o-phenylphenol (Dowicide 1) | ethylene diamine | 55–60 |
| " | formamide | 50–3 |
| " | hydrazine | 60–4 |
| Dichlorophene | formamide | 90–3 |
| 2,2'-methylenebis (4-ethyl-6-t.butylphenol) (Antioxidant 425) | triethanolamine | 68–70 |
| Bisphenol A | ethylene diamine | 100–4 |
| " | propylene diamine | 94–100 |
| " | t-butylamine ethyl methacrylate | 90–2 |
| 4,4'-thiobis (6-t.butyl-m-cresol) (Santowhite crystals) | triethanolamine | 95–8 |
| " | ethylene diamine | 106–11 |
| " | propylene diamine | 125–35 |
| " | t.butylamine ethyl methacrylate | 62–5 |
| 4,4'-butylidenebis (6-t.butyl-m-cresol) (Santowhite Powder) | triethanolamine | 68–70 |
| 2,2'-methylenebis (4-methyl-6-t.butylphenol) (Antioxidant 2246) | diethanolamine | 62–5 |
| " | ethylene diamine | 54–8 |
| p-cyclohexyl phenol | triethanolamine | 35–40 |
| " | ethylene diamine | 125–30 |
| " | diethylene triamine | 70–85 |
| " | propylene diamine | 88–90 |
| o-cyclohexyl phenol | ethylene diamine | 88–93 |
| " | hydrazine | 75–80 |
| p-t.butyl phenol | ethylene diamine | 70–3 |
| " | propylene diamine | 54–7 |
| p.-sec. butyl phenol | ethylene diamine | 50–4 |
| p-bromophenol | formamide | 35–8 |
| 2,4,6-tribromophenol | ethylenediamine | 135–8 |
| " | propylenediamine | 85–9 |
| " | formamide | 90–3 |
| pentachlorophenol | diethanolamine | 145–55 |
| " | triethanolamine | 133–7 |
| " | ethylenediamine | 115–20 |
| " | diethylenetriamine | 185–90 |
| " | propylene diamine | 168–72 |
| " | formamide | 100–5 |
| " | hydrazine | 200–5 |
| " | t-butyl amine ethyl methacrylate | 115–20 |
| 2,6-dichlorophenol | triethanolamine | 83–6 |
| " | ethylene diamine | 110–15 |
| " | propylenediamine | 100–155 |
| " | formamide | 40–5 |
| " | hydrazine | 115–20 |
| " | t.butyl amine ethyl methacrylate | 100–5 |
| 2-chloro-4-phenyl phenol | ethylene diamine | 130–5 |
| " | propylene diamine | 50–4 |
| " | hydrazine | 108–12 |
| tetrachlorophenol (Dowicide 6) | diethanolamine | 110–25 |
| " | triethanolamine | 98–104 |
| " | ethylene diamine | 192–5 |
| " | propylene diamine | 165–70 |
| " | formamide | 85–90 |
| " | hydrazine | 163–5 |
| " | t.-butyl amino ethyl | |

TABLE IV-continued
AROMATIC HYDROXY COMPLEXES

| Phenol | Amine | Dissociation Temp.° C |
|---|---|---|
| | methacrylate | 95–100 |
| 2,4,6-trichlorophenol | ethylene diamine | 105–14 |
| " | propylene diamine | 100–5 |
| " | formamide | 85–90 |
| " | hydrazine | 150–7 |
| " | t.-butyl amine ethyl methacrylate | 70–5 |
| β-β-ethylenediimino-o-cresol | formamide | 105–10 |
| " | t.butylamine ethyl-methacrylate | 118–12 |
| Bisphenol A | benzylamine | 70–4 |
| 4,4'-isopropylidenebis (2,6-dibromophenol) (Tetrabromobisphenol A) | 2-amino-1-butanol | 155–62 |
| " | aminoethylenethanolamine | 74–85 |
| " | 2-amino-2-ethyl-1, 3-propenediol | 130–40 |
| " | 2-amino-2-methyl-1, 3-propeneiol | 154–60 |
| " | aminoethyl piperazine | 140–50 |
| " | 2-amino-2-methyl-1-propanol | 180–90 |
| " | 2-amino-1-phenyl-1-propanol | 100–30 |
| " | 3-amino propanol | 190–5 |
| " | benzylamine | 144–8 |
| " | chloroacetamide | 114–22 |
| " | 3-chloro-N-methyl-acetamide | 80–5 |
| Tetrabromobisphenol A | n-decylamine | 170–90 |
| " | 1,3-diamino propane | 218–225 |
| " | 3-di-n-butyl amino propylamine | 150–8 |
| " | diethanolamine | 140–3 |
| " | diethyl amino ethoxy ethanol | 180–5 |
| " | diethylamino propylamine | 175–85 |
| " | N-diethyl amino propyl-1-methyloctadecylamine | 88–100 |
| " | diethylisopropanolamine | 135–42 |
| " | diisopropanolamine | 65–75 |
| " | diisopropylethanolamine | 158–165 |
| " | dimethylacetamine | 95–100 |
| " | dimethylamino propylamine | 198–202 |
| " | dimethylethanolamine | 135–45 |
| " | dimethylformamide | 60–5 |
| " | N-(1,1-dimethyl-2-hydroxy ethyl)-2-methyl 1-1, 2-Propane diamine | 130–40 |
| Tetrabromobisphenol A | t.-dodecylaminopropylamine | 90–105 |
| " | ethanolamine | 170–80 |
| " | N-ethylethanolamine | 90–100 |
| " | N-ethyldiethanolamine | 137–42 |
| " | hexamethyl phosphoramide | 127–30 |
| " | n-hexylamine | 200–10 |
| " | hydroxyethyl diethylene triamine | 60–80 |
| " | N-2-hydroxyethyl-1-methyl dodecylamine | 100–110 |
| " | N-hydroxyethyl piperazine | 190–200 |
| " | hydroxy ethyl trihydroxy propyl-ethylene diamine | 45–55 |
| " | iminobispropylamine | 210–20 |
| " | isobutylamine | 160–70 |
| " | isopropylamine | 165–75 |
| " | 3-isopropoxypropanolamine | 165–75 |
| " | isopropylamine | 160–70 |
| " | methanediamine | 140–5 |
| " | methyldiethanolamine | 132–6 |
| " | methyl ethanol amine | 143–6 |
| " | N-methyl-bis-amino propylamine | 210–20 |
| " | polyglycol amine H-119 | 115–20 |
| " | polyglycolamine H-176 | 195–205 |
| " | polyglycolamine H-221 | 165–174 |
| " | 1,2-propanediamine | 150–160 |
| " | propylenediamine | 148–155 |
| " | tetramethylethylene-diamine | 190–200 |
| " | tetramethylguanidine | 225–235 |
| " | triethanolamine | 154–8 |
| " | triethylene tetramine | 200–15 |
| " | triisopropanolamine | 135–9 |
| p,p'-biphenol | hexamethyl phosphoramide | 40–50 |
| 4-hydroxy propiophenone | hydrazine | 84–90 |
| 2,2'-methylene bis (2,4,6-trichlorophenol) | aminoethylethanolamine | 165–7 |
| " | 2-amino-2-ethyl-1,3-propanediol | 151–70 |
| " | 2-amino-2-methyl-1,3-propanediol | 182–4 |
| " | benzylamine | 210–16 |
| | t-butylaminoethyl | |

TABLE IV-continued

AROMATIC HYDROXY COMPLEXES

| Phenol | Amine | Dissociation Temp.° C |
|---|---|---|
| " | methacrylate | 123–6 |
| " | diethanolamine | 75–8 |
| " | diethylenetriamine | 90–110 |
| 2,2'-methylene bis (2,4,6-trichlorophenol) | dimethylethanolamine | 183–93 |
| " | N-ethyldiethanolamine | 124–7 |
| " | ethylene diamine | 187–92 |
| " | formamide | 125–30 |
| " | hexamethyl prosphoramide | 85–90 |
| " | hydrazine | 180–4 |
| " | N-methylbisamino propylamine | 157–65 |
| " | methyldiethanolamine | 154–7 |
| 2,2'-methylene bis (2,4,6-trichlorophenol) | methylethanolamine | 193–200 |
| " | polyglycolamine H- | 208–24 |
| " | propylenediamine | 135–40 |
| " | triethanolamine | 142–6 |
| 2,4-dichloro-6-phenyl phenol | diethylene triamine | 115–20 |
| " | ethylene diamine | 100–4 |
| " | propylenediamine | 92–4 |
| 2-bromo-4-phenyl phenol | benzylamine | 85–95 |
| " | diethylenetriamine | 78–82 |
| " | ethylenediamine | 66–8 |
| " | formamide | 55–8 |
| " | hydrazine | 82–8 |
| p-phenyl phenol | benzylamine | 70 |
| " | diethlenetriamine | 99–104 |
| " | ethylenediamine | 137–43 |
| " | formamide | 113–5 |
| " | hexamethyl phosphoramide | 34–5 |
| " | hydrazine | 155–8 |
| " | propylene diamine | 71–81 |
| " | triethylene tetramine | 63–5 |
| 2,2'-thiobis (4,6-dichlorophenol | 2-amino-2-ethyl-1,3-propanediol | 125–59 |
| " | benzylamine | 197–9 |
| " | diethanolamine | 143–7 |
| " | diethylene triamine | 158–74 |
| " | dilosopropanolamine | 155–62 |
| " | dimethylacetamide | 190–3 |
| " | dimethylethanol amine | 120–3 |
| " | N-ethyldiethanolamine | 127–30 |
| " | ethylene diamine | 125–30 |
| " | hydrazine | 195–200 |
| " | iminobispropylamine | 50–74 |
| " | methyldiethanolamine | 127–40 |
| " | polyglycolamine H-176 | 210–14 |
| " | propylene diamine | 142–5 |
| " | formamide | 115–25 |
| " | triethanolamine | 165–8 |
| " | triisopropanolamine | 151–5 |
| 2,2' methylene bis (4-chlorophenol) | benzylamine | 60–100 |
| " | formamide | 90–3 |
| 4,4'-isopropylidene bis (2,6-dichlorophenol) | 2-amino-1-butanol | 166–70 |
| " | aminoethylethanolamine | 154–8 |
| " | 2-amino-2-ethyl-1,2-propanediol | 166–8 |
| " | 2-amino-2-methyl-1, 3-propanediol | 172–5 |
| " | 3-amino propanol | 180–90 |
| " | amylamine | 200–10 |
| " | aniline | 90–6 |
| " | benzylamine | 145–55 |
| 4,4'-isopropylidene bis (2,6-dichlorophenol) | t.butylaminoethyl methacrylate | 132–5 |
| " | cyclohexylamine | 190–204 |
| " | n-decylamine | 193–8 |
| " | 1,3-diamino propane | 230–5 |
| " | dibutylamine | 124–57 |
| " | 3-di-n-butylamine propylamine | 155–64 |
| " | dibutylmethylamine | 120–31 |
| " | dicyclohexylamine | 202–6 |
| " | diethanolamine | 150–3 |
| " | diethylamine | 142–7 |
| " | diethylaminoethyl methacrylate | 115–7 |
| " | β-diethylaminopropionitrile | 94–6 |
| " | 3-ethylamino propionitrile | 103–5 |
| " | di-2-ethylhexylamine | 100–5 |
| " | diethylene triamine | 210–15 |
| " | diethylisopropanolamine | 125–35 |
| " | diisopropylethanolamine | 162–4 |
| " | diisopropylamine | 141–52 |
| " | β-dimethylamino propio- | |

TABLE IV-continued

AROMATIC HYDROXY COMPLEXES

| Phenol | Amine | Dissociation Temp.° C |
|---|---|---|
| " | nitrile | 70–3 |
| " | dimethylaminopropylamine | 197–203 |
| " | dimethylethanolamine | 140–6 |
| " | di-n-propylamine | 142–53 |
| " | 3-t.-dodecylaminopropylamine | 100–5 |
| " | ethanolamine | 96–104 |
| " | N-ethylcyclohexylamine | 161–78 |
| " | N-ethyldiethanolamine | 154–5 |
| " | ethylene diamine | 208–10 |
| " | N-ethylethanolamine | 87–110 |
| " | formamide | 103–8 |
| " | hexamethylphosphoramide | 122–4 |
| " | n-hexylamine | 168–85 |
| " | hydrazine | 142–6 |
| " | hydroxyethylethylene diamine | 94–100 |
| " | iminobispropylamine | 220–3 |
| " | isobutylamine | 152–67 |
| " | isodecylamine | 187–95 |
| " | isooctylamine | 172–84 |
| " | isopropanolamine | 150–7 |
| " | 3-isopropoxyisopropanolamine | 160–7 |
| " | β-isopropylaminopropionitrile | 103–7 |
| " | 3-isopropylamine propylamine | 122–7 |
| " | isoquinoline | 102–4 |
| " | 2,6-lutidine | 125–32 |
| " | methanediamine | 186–90 |
| " | N-methyl bis amino propylamine | 219–36 |
| 4,4'-isopropylidene bis (2,6-dichlorophenol) | methylaminopropylamine | 207–13 |
| " | methylbenzylamine | 145–55 |
| " | N-methyldiethanolamine | 148–52 |
| " | N-methylethanolamine | 85–102 |
| " | 3,3'-methyl iminobis propylamine | 190–9 |
| " | N-methyl morpholine | 120–4 |
| " | N-methyl-2-pyrrolidone | 70–3 |
| " | morpholine | 159–60 |
| " | phenyldiethanolamine | 85–95 |
| " | phenylethanolamine | 88–95 |
| " | 2,2'-phenyliminodiethanolamine | 55–70 |
| " | γ-picoline | 96–9 |
| " | polyglycolamine H-119 | 156–63 |
| " | polyglycolamine H-169 | 123–33 |
| " | polyglycolamine H-176 | 210–18 |
| " | polyglycolamine H-221 | 196–200 |
| " | propylenediamine | 168–75 |
| " | pyridine | 117–30 |
| " | tetraethylene pentamine | 92–102 |
| " | tributylamine | 103–8 |
| " | triethylamine | 155–64 |
| " | triethanolamine | 139–45 |
| " | triethylene tetramine | 215–20 |
| " | triisopropanolamine | 125–30 |
| " | trimethylenediamine | 230–5 |
| " | dimethylacetamide | 132 |
| 5-chloro-2-hydroxy benzophenone | ethylenediamine | 190–4 |
| 2,2'-methylene bis (4-ethyl 6-dibutyl phenol) | benzylamine | 76–85 |
| " | triethanolamine | 68–70 |
| o-phenyl phenol | ethylenediamine | 55–60 |
| " | formamide | 50–3 |
| " | hydrazine | 60–4 |
| 4,4'-isopropylidene bisphenol | benzylamine | 80–90 |
| " | t-butylaminoethyl-methacrylate | 90–2 |
| " | cyclohexylamine | 108–10 |
| " | dibutylamine | 120–52 |
| " | diethylamine | 117–53 |
| " | dimethylamine propylamine | 105–8 |
| " | di-n-propylamine | 90–100 |
| " | ethylenediamine | 100–4 |
| " | formamide | 66–8 |
| " | isobutylamine | 88–93 |
| " | methanediamine | 128–30 |
| " | N-methyliminobis-propylamine | 94–8 |
| " | propylenediamine | 95–100 |
| " | triethylenetetramine | 137–9 |
| 4,4'-thiobis (6-t.butyl-m-cresol) | t.butylamino ethyl methacrylate | 62.5 |
| " | cyclohexylamine | 78–85 |

TABLE IV-continued
AROMATIC HYDROXY COMPLEXES

| Phenol | Amine | Dissociation Temp.° C |
|---|---|---|
| " | ethylenediamine | 112–15 |
| " | iminobispropylamine | 85–95 |
| " | isopropylamine | 164–6 |
| " | propylenediamine | 130–6 |
| " | pyridine | 160–5 |
| " | triethanolamine | 95–8 |
| 4,4'-butylidene bis (m-cresol) | acetamine | 82–3 |
| " | benzylamine | 135 |
| " | cyclohexylamine | 214–7 |
| " | ethylenediamine | 213–7 |
| " | triethanolamine | 68–70 |
| 2,2'-methylene bis (4-methyl-6-t.butylphenol) | 2-amino-1-butanol | 58–64 |
| " | benzylamine | 69–79 |
| " | decylamine | 52–3 |
| " | 1,3-diaminopropane | 50–5 |
| " | N-dibutylethylamine | 60–5 |
| " | diethanolamine | 62–5 |
| " | di-n-hexylamine | 81–9 |
| " | ethyl cyclohexylamine | 92–4 |
| " | N-ethyl diethanolamine | 68–71 |
| " | isopropylaminoisopropylamine | 128–32 |
| " | ethylene diamine | 54–8 |
| " | hexamethyl phosphoramide | 58–65 |
| " | isoquinoline | 121–5 |
| " | N-methyldiethanolamine | 127–34 |
| " | methyl ethanolamine | 74–84 |
| " | triamylamine | 65–75 |
| " | triethanolamine | 61–5 |
| p-cyclohexyl phenol | triethanolamine | 35–40 |
| " | benzylamine | 50–5 |
| " | diethylenetriamine | 70–85 |
| " | ethylene diamine | 125–30 |
| " | hexamethyl phosphoramide | 97–109 |
| " | hydrazine | 115–20 |
| " | propylene diamine | 88–90 |
| o-cyclohexyl phenol | benzylamine | 82–95 |
| " | ethylene diamine | 88–93 |
| " | hydrazine | 75–80 |
| p.t.-butyl phenol | benzylamine | 70–80 |
| " | ethylenediamine | 70–3 |
| " | hydrazine | 45–50 |
| " | propylenediamine | 54–6 |
| p-bromophenol | formamide | 35–8 |
| 2,4-dibromophenol | benzylamine | 80–5 |
| 2,4,6-tribromophenol | t.butyl amino ethyl methacrylate | 68–71 |
| " | benzylamine | 125–30 |
| " | ethylene diamine | 135–8 |
| " | formamide | 90–3 |
| " | hydrazine | 145–54 |
| " | propylene diamine | 87–92 |
| Pentachlorophenol | benzylamine | 155–60 |
| " | t.-butylaminoethyl methacrylate | 115–20 |
| " | diethanolamine | 145–55 |
| " | diethylenetriamine | 185–90 |
| " | ethylenediamine | 115–20 |
| " | formamide | 100–105 |
| " | hexamethyl phosphoramide | 79–83 |
| " | hydrazine | 200–205 |
| " | propylenediamine | 168–72 |
| " | triethanolamine | 133–7 |
| 2,6-dichlorophenol | benzylamine | 100–5 |
| " | t.butylaminoethyl methacrylate | 100–5 |
| " | diethanolamine | 83–6 |
| " | ethylenediamine | 110–15 |
| " | formamide | 40–5 |
| " | hydrazine | 115–20 |
| " | propylenediamine | 115–25 |
| 2-chloro-4-phenyl phenol | benzylamine | 95–100 |
| " | ethylenediamine | 130–5 |
| " | hydrazine | 108–12 |
| " | propylenediamine | 50–4 |
| tetrachlorophenol | benzylamine | 115–25 |
| " | t.butylaminoethyl methacrylate | 95–100 |
| " | diethanolamine | 110–25 |
| " | ethylenediamine | 192–5 |
| " | formamide | 85–90 |
| " | hydrazine | 163–5 |
| " | propylenediamine | 165–70 |
| " | triethanolamine | 98–104 |
| 2,4,6-trichlorophenol | benzylamine | 120–5 |
| " | t.butylaminoethyl methacrylate | 70–5 |
| " | ethylenediamine | 105–14 |
| " | formamide | 85–90 |

TABLE IV-continued

AROMATIC HYDROXY COMPLEXES

| Phenol | Amine | Dissociation Temp.° C |
|---|---|---|
| " | hydrazine | 150-7 |
| " | propylenediamine | 100-5 |
| 2,4-dichloro-1-naphthol | benzylamine | 55-60 |
| " | diethanolamine | 65-70 |
| " | diethylenetriamine | 79-83 |
| " | formamide | 78-82 |
| " | hydrazine | 83-93 |
| " | triethanolamine | 63-5 |
| 2-naphthol | benzylamine | 40-5 |
| " | ethylenediamine | 86-9 |
| " | formamide | 56-59 |
| " | hydrazine | 110-12 |
| 4,4-isopropylidene bis (p-chlorophenol) | benzylamine | 105-10 |
| " | formamide | 55-60 |
| " | hexamethyl phosphoramide | 46-8 |
| " | hydrazine | 100-112 |
| 2,6-dibromo-t.butyl phenol | benzylamine | 75-90 |
| " | diethylenetriamine | 85-96 |
| " | ethylenediamine | 95-105 |
| " | hydrazine | 105-110 |
| " | propylenediamine | 95-100 |
| " | triethanolamine | 104-6 |
| phenol | ethylenediamine | 56-62 |
| " | hydrazine | 48-56 |
| 2,4,5-trichlorophenol | benezylamine | 118-20 |
| " | t.butylaminoethyl methacrylate | 55-60 |
| " | diethanolamine | |
| 1,1-di 10 | | |
| " | diethylenetriamine | 85-95 |
| " | ethylenediamine | 55-60 |
| " | hydrazine | 94-100 |
| " | propylenediamine | 96-104 |
| 1,1-di (4-hydroxyphenyl) cyclohexane | diethanolamine | 100-112 |
| " | propylenediamine | 120-5 |
| 1,1-di (3,5-dibromo-4-hydroxy phenyl) cyclohexane | diethanolamine | 149-54 |
| " | propylenediamine | 175-80 |
| 3,3-bis (3,5-dibromo-4-hydroxy phenyl) pentane | propylenediamine | 183-92 |
| 2,2-bis (3,5-dibromo-4-hydroxy phenyl) pentane | diethanolamine | 110-18 |
| " | propylenediamine | 180-90 |
| bis (3,5-dibromo-4-hydroxy phenyl) methane | diethanolamine | 115-23 |
| 2,2-bis (3,5-dibromo-4-hydroxy phenyl) butane | diethanolamine | 142-5 |
| " | propylenediamine | 174-6 |
| 3,3'-5,5'-tetrabromo-4,4'-dihydroxy biphenyl | diethanolamine | 173-80 |
| " | propylene diamine | 180-2 |
| 1-phenyl-1, 1-di (3,5-dibromo-4-hydroxy phenyl) ethane | diethanolamine | 145-50 |
| " | propylenediamine | 185-200 |
| 2,2-di (3,5-dibromo-4-hydroxyphenyl) 4-methyl-penetane | diethanolamine | 115-20 |
| " | propylenediamine | 190-4 |
| 2,2-di (3,5 dibromo-4-hydroxy phenyl) heptane | diethanolamine | 145-50 |
| " | propylenediamine | 195-7 |
| 1,1-i (3,5-dibromo-4-hydroxy phenyl) butane | diethanolamine | 100-15 |
| " | propylene diamine | 173-7 |
| 2,2-di (3,5-dibromo-4-hydroxy phenyl) octane | diethanolamine | 140-2 |
| 1,1-di (3,5-dibromo-4-hydroxy phenyl) ethane | diethanolamine | 105-10 |
| " | propylenediamine | 175-8 |
| 2,4-dihydroxybenzophenone | propylenediamine | 212-18 |
| 3,5-dichlorosalicylaldehyde | diethanolamine | 100-5 |
| " | hexamethyl phosphoramide | 70-84 |
| " | propylenediamine | 135-45 |
| bisphenol A disalicylate | diethanolamine | 150-5 |
| " | propylenediamine | 155-75 |
| tetrachlorohydroquinone | diethanolamine | 146-50 |
| " | propylene diamine | 175-80 |
| 2-hydroxy-5-phenyl-propiophenone | propylenediamine | 180-5 |
| 2,4,6-tribenzoyl resorcinol | diethanolamine | 125-30 |
| " | propylenediamine | over 280 |
| 3,5-dibromosalicylaldehyde | diethanolamine | 90-8 |
| " | hexamethylphosphoramide | 83-95 |
| " | propylenediamine | 150-2 |
| 2-isopropyl-4,6-dinitro-phenol | diethanolamine | 105-10 |
| " | propylenediamine | 188-90 |
| 3,4,6-trichloro-2-nitro | | |

TABLE IV-continued

AROMATIC HYDROXY COMPLEXES

| Phenol | Amine | Dissociation Temp.° C |
|---|---|---|
| phenol | diethanolamine | 146–50 |
| " | propyleneiamine | 185–90 |
| 1,1-methylenebis-2-naphthol | diethanolamine | 135–40 |
| " | hexamethylphosphoramide | 142–4 |
| " | propylenediamine | 160–5 |
| 1,1-di-2-naphthol | diethanolamine | 158–74 |
| " | hexamethylphosphoramide | 112–20 |
| " | propylenediamine | 120–30 |
| 1,1-thio bis (2-naphthol) | diethanolamine | 135–42 |
| " | hexamethyl phosphoramide | 124–8 |
| " | propylenediamine | 120–5 |
| p-chlorotrisphenol | diethylene triamine | 132–8 |
| " | hexamethylphosphoramide | 149–51 |
| 1,1-bis (3,5-dichloro-4-hydroxyphenyl) cyclohexane | benzylamine | 144–52 |
| 1,1-bis (3,5-dichloro-4-hydroxy phenyl) cyclohexane | diethanolamine | 140–3 |
| " | diisopropyl ethanolamine | 164–8 |
| " | dimethyl ethanolamine | 169–85 |
| " | methyl diethanolamine | 131–9 |
| " | methyl ethanolamine | 165–71 |
| " | polyglycolamine H-176 | 192–200 |
| pentabromophenol | aminoethylethanolamine | 131–3 |
| " | 2-amino-2-methyl-1,3-propanediol | 170–9 |
| " | benzylamine | 155–8 |
| " | diethanolamine | 158–61 |
| " | diisopropanolamine | 178–37 |
| " | diisopropylethanolamine | 130–3 |
| " | N-ethyldiethanolamine | 93–8 |
| " | methyl diethanolamine | 120–3 |
| " | methyl ethanolamine | 163–5 |
| " | triethanolamine | 129–34 |
| hydroquinone | acetamide | 99–105 |
| " | formamide | 63–5 |
| " | morpholine | 64–8 |
| " | piperazine | 187–95 |
| resorcinol | hydrazine | 48–55 |
| " | piperazine | 147–52 |
| pyrogallol | formamide | 55–8 |
| " | acetamide | 58–65 |

Likewise, hydrocarbon solutions of styrene polymers or copolymers, acrylate or methacrylate polymers or copolymers, hydrocarbon resins, elastomeric polymers, and the like, can be used. The limits for the concentration are governed by desirable coating viscosities, dry weight of the coating, and the like. Concentrations of complexes varying between 5 and 50 percent have been found to be convenient.

Similarly, the leuco dye color-forming material is also dispersed by ball-milling or by other convenient means in a solvent-binder system which will not dissolve and dissociate the phenolic molecular complex. The reactive ingredients are ground separately in this case to permit more convenient variation of the ratios of the co-reacting leuco dyes and phenolic complexes. However, this is not a requirement as the leuco dyes and phenolic complexes have been ground together without encountering any signs of mix instability or loss of the marking characteristics of the dried coating. This is not true when the leuco dye, for example Crystal Violet Lactone, is ground with the free phenolic material. The ground mixture becomes highly colored and is useless as a coating material.

Coating Applications

The mixtures of grinds of the leuco dyes and molecular complexes of phenolic materials were applied by Meyer rod to a 25lb/3000 sq ft sulfite base paper and allowed to air-dry. Dry coating weights of the thermosensitive coatings were varied from 1.5 lb/3000sq ft. to over 10 lb/3000 sq ft and useful records were made with each coating.

Recording or Imaging the Sensitized Sheets

The utility of the described thermosensitive coatings was demonstrated by reproduction of legible copies using a 3M thermal copier sold under the trade name Thermofax Secretary. A Texas Instruments thermal matrix printer, the Silent 700, was used to demonstrate printing with a computer-driven, high speed thermal printer. The thermosensitive coated sheets where run through a Sanborn 500 Viso Cardiette recorder, commonly used in recording electrocardiograms to give useful records demonstrating the chart-recording capabilities. The following examples illustrate the working of this invention.

EXAMPLE 1

A leuco dye combined with representative complexes of phenolic materials

Crystal Violet Lactone or 3,3-bis-(p-dimethyl amino phenyl)-6-dimethylamino phthalide sold by Hilton-Davis as Brilliant Violet Leuco 70-3044, a well known lactone which is widely used in thermal recording papers and pressure marking papers, was combined in different ratios with molecular complexes formed from a variety of phenolic materials and different amines as the complexing agents. The components were prepared as a 15 percent concentration of the leuco dye or the phenolic molecular complex in a 5 percent solution of polyvinyl alcohol in water. These were ground by ball-milling overnight and combined in various ratios to form the coating mixes. The coatings were applied by Meyer rod to a 25 lb/3000 sq. ft sulfite paper and air-dried to give a variety of coating weights. All were imaged satisfactorily on a 3M Thermofax Secretary thermal copier, a Texas Instruments Silent 700 thermal printer, and a Sandborn Viso Cardiette electrocardiogram chart recorder. In all cases, a bright blue mark was obtained on a white background.

tive leuco dyes was dispersed in a manner similar to that described in Example 1, coated on 25 lb/3000 sq. ft sulfite paper and the dry coated sheets were imaged on the Thermofax Secretary, the Texas Instruments Silent 700 and the Sandborn 500 Viso Cardiette.

TABLE V

| | Complexes | | Ratio Complex/ | Weight-Coat |
|---|---|---|---|---|
| | Phenolic | Amine | Leuco Dye | lb./3000 sq. ft. |
| (a) | 2,2-thiobis(4,6-dichlorophenol) | Cyclohexylamine | 4/1 | 1.9 |
| | " | " | 2/1 | 2.8 |
| | " | " | 1/1 | 2.2 |
| | " | " | 1/2 | 2.8 |
| (b) | 2,2-thiobis(4,6-dichlorophenol) | diisopropanolamine | 4/1 | 3.7 |
| | " | " | 2/1 | 2.3 |
| | " | " | 1/1 | 2.4 |
| | " | " | 1/2 | 3.1 |
| (c) | 2,2-thiobis(4,6-dichlorophenol) | N-methylethanolamine | 4/1 | 1.6 |
| | " | " | 2/1 | 2.1 |
| | " | " | 1/1 | 1.5 |
| | " | " | 1/2 | 2.2 |
| (d) | 2,2-thiobis (4,6-dichlorophenol) | diethanolamine | 2/1 | 4.6 |
| (e) | 2,2-thiobis(4,6-dichlorophenol) | ethanolamine | 2/1 | 3.2 |
| (f) | 2,2'-methylenebis (3,4,6-trichlorophenol) | triisopropanolamine | 4/1 | 7.5 |
| | " | " | 2/1 | 10.2 |
| (g) | " | N-methylethanolamine | 4/1 | 8.0 |
| | " | " | 2/1 | 6.5 |
| (h) | " | dimethylethanolamine | 2/1 | 3.0 |
| (i) | " | cyclohexylamine | 6/1 | 4.0 |
| | " | " | 4/1 | 4.0 |
| | " | " | 2/1 | 3.8 |
| | " | " | 1/2 | 3.2 |
| (j) | " | N-ethyldiethanolamine | 4/1 | 4.0 |
| (k) | 1,1-bi-2-naphthol | Cyclohexylamine | 2/1 | 3.7 |
| | " | " | 1/1 | 4.2 |
| | " | " | 1/2 | 6.5 |
| (l) | 2,2'-methylene bis(3,4,6-trichlorophenol) | N-ethylethanolamine | 2/1 | 4.0 |
| | " | " | 1/1 | 3.0 |
| | " | " | 1/2 | 2.5 |
| (m) | 2,5-dichlorohydroquinone | Cyclohexylamine | 4/1 | 4.5 |
| | " | " | 2/1 | 3.6 |
| | " | " | 1/2 | 4.0 |
| (n) | 2-naphthol | Cyclohexylamine | 2/1 | 2.5 |
| (o) | hydroquinone | Cyclohexylamine | 2/1 | 5.0 |
| (p) | resorcinol | Cyclohexylamine | 2/1 | 3.0 |
| (q) | 1,1-butylidene(biphenol) | Cyclohexylamine | 2/1 | 3.5 |
| (r) | Bisphenol A | Cyclohexylamine | 4/1 | 3.5 |
| | " | " | 2/1 | 2.6 |
| | " | " | 1/1 | 2.8 |
| | " | " | 1/2 | 2.2 |
| (s) | p-phenylphenol | Cyclohexylamine | 4/1 | 3.0 |
| | " | " | 2/1 | 3.1 |
| | " | " | 1/1 | 2.9 |
| | " | " | 1/2 | 2.5 |
| (t) | 2,2'-dihydroxy-5,5'-dichlorophenylmethane | Cyclohexylamine | 4/1 | 2.8 |
| | " | " | 2/1 | 3.4 |
| | " | " | 1/1 | 3.3 |
| | " | " | 1/2 | 2.7 |

EXAMPLE 2

The molecular complex of 2,2'-methylene bis (3,4,6-trichlorophenol) with cyclohexylamine and representa-

TABLE VI

| | | Ratio Complex/ Dye | Wt. Coat lb/3000 sq. ft | Color |
|---|---|---|---|---|
| (a) | 3,3-bis(1-ethyl-2-methylindol-3-yl) phthalide | 2/1 | 3.0 | red |
| (b) | 3-diethylamino-7-(N-methyl-p-toluidino)fluoran | 2/1 | 2.2 | green |
| (c) | 3-dibutylamino-6-methyl-7-chlorofluoran | 2/1 | 2.8 | red |
| (d) | 3,3-bis (dimethylaminophenyl)phthalide | 2/1 | 3.1 | green |
| (e) | 2,2'-spiro bi(benzo (f) chromene) | 2/1 | 3.5 | blue-violet |
| (f) | 3-methyl-2,2'-spiro bi(benzo (f) chromene) | 2/1 | 1.9 | blue |
| (g) | 6'-chloro-8'-methoxybenzoindolino spiropyran | 2/1 | 2.4 | blue |
| (h) | 8'-methoxybenzoindolinospiropyran | 2/1 | 3.0 | brownish black |
| (i) | spiropyran from 2-hydroxy-1-napthaldehyde and the salt of methyl-p-toluenesulfonate with 2-methlbenzothiazole | 2/1 | 3.6 | blue-black |
| (j) | 2'-anilino-6'-diethylamino-3'-methylfluoran | 2/1 | 2.4 | green |
| (k) | 3-(ethyl-p-tolylamino)-7-(methylphenylamino) fluoran | 2/1 | 2.9 | green |

EXAMPLE 3

Comparison of stabilities, staining, flooding, railroading.

(a) A mixture of 5 parts of Crystal Violet Lactone and 10 parts of the complex obtained by reacting cyclohexylamine with 2,2'-methylenebis(3,4,6-trichlorophenol) is 85 parts of a 5-percent solution of polyvinylalcohol in water was ball-milled for 24 hours. The web coating mixture, which was colorless, was coated onto a 25 lb/3000 sq. ft sulfite paper with a No. 16 Meyer rod and air-dried to give a white coating weighing 3.1 lb/3000 sq. ft. This coated paper was run through a Sanborn 500 Viso Cardiette recorder to give a bright blue trace on a white background. Good trace resolution was obtained without excessive flooding or railroading (developing two bars or streaks on the path made by a hot stylus).

(b) (a) was repeated except that the phenol complex was replaced with pure 2,2'-methylenebis (3,4,6-trichlorophenol). Color developed very early during ball-milling and the mix was a deep blue-grey after 8 hours grinding. This grind was useless in the preparation of a thermo-sensitive coated paper.

(c) The crystal violet lactone and the 2,2'-methylene bis(3,4,6-trichlorophenol) were ball-milled as separate dispersions and then mixed and coated on the sulfite paper. This coating when run through the Sanborn recorder showed excessive flooding and railroading. In addition, the coated sheets on standing for a period of time developed a blue stain or background which also indicates instability.

(d) Similar results were obtained using the complexed phenolics in Example 2 as a comparison against the phenolic materials which had not been complexed. In all cases, the coatings containing the pure phenolics had a tendency to mark with paper clips or other sharply applied pressure. This accidental marking or marring was eliminated or greatly reduced by replacing the pure phenolic with a complexed phenolic material.

Activators may be used to lower the activation temperatures of the systems described above. The image mark is also intensified. Some preferred activators are ureas such as phenylurea, phenylthiourea, and allylurea; carbanilide; thiocarbanilide; zinc acetoacetonate; fatty acid salts of zinc such as zinc stearate and zinc palmitate; and salicylanilide.

What is claimed is:

1. A heat sensitive recording composition comprising
   a binder,
   a chromogenic compound reactive with a phenol at elevated temperatures to develop a color contrasting visibly with the normal color of said compound, said chromogenic compound being selected from the group consisting of lactone type leuco dyes and spiropyran type leuco dyes, and
   a hydrogen-bonded molecular complex of a phenol selected from Table III of the specification and a complexing agent selected from the group consisting of amines and amides, said complex being in stable, unreactive form below 50° C and dissociable into a phenol and an amine or amide by heating above a dissociation temperature in the range of from about 50° to 220° C.

2. The recording composition of claim 1, wherein said chromogenic compound comprises a lactone type leuco dye.

3. The recording composition of claim 2, wherein said lactone type leuco dye is a compound selected from Table I of the specification.

4. The recording composition of claim 1, wherein said chromogenic compound comprises a spiropyran type leuco dye.

5. The recording composition of claim 4, wherein said spiropyran type leuco dye is a compound selected from Table II of the specification.

6. The recording composition of claim 1, wherein said complexing agent is a compound selected from the amines listed in Table IV of the specification.

7. The recording composition of claim 1, wherein said chromogenic compound is a leuco dye selected from Table VI of the specification, and said complex comprises a combination of 2,2'-methylenebis (3,4,6-trichlorophenol) with cyclohexylamine.

8. The recording composition of claim 1, and further comprising an activator adapted to lower the temperature at which color is developed, said activator being a compound selected from the group consisting of ureas, thioureas, carbanilide, thiocarbanilide, zinc acetoacetonate, and fatty acid salts of zinc.

9. A method for producing a recording composition sensitive to heat and insensitive to pressure, comprising the steps of
   combining a phenol selected from Table III of the specification with a complexing agent selected from the group comprising amines and amides to form a hydrogen - bonded molecular complex,
   combining in a mixture a chromogenic compound reactive with a phenol at elevated temperatures to develop a color contrasting with the normal color of said compound, said chromogenic compound being selected from the group consisting of lactone type leuco dyes and spiropyran type leuco dyes, and a hydrogen-bonded molecular complex of a phenol selected from Table III of the specification and a complexing agent selected from the group consisting of amines and amides,
   dissolving a binder in a solvent in which said complex is insoluble to form a binder-solvent solution,
   dispersing said mixture in the binder-solvent solution to form a dispersion,
   applying said dispersion to a substrate, and
   evaporating solvent from said dispersion to form a thermosensitive coating adapted to develop a color at elevated temperatures.

10. The method of claim 8, and further comprising the step of comminuting particles of the mixture to a diameter of less than 10 microns prior to dispersing said mixture in the binder-solvent solution.

11. A heat sensitive recording composition comprising
   a binder,
   a chromogenic compound reactive with a phenol at elevated temperatures to develop a color contrasting visibly with the normal color of said compound, said chromogenic compound being selected from the group consisting of lactone type leuco dyes and spiropyran type leuco dyes, and
   a hydrogen-bonded molecular complex of a phenol selected from Table IV of the specification and a complexing agent selected from the group consisting of amines and amides, said complex being in stable, unreactive form below 50° C and dissociable into a phenol and an amine or amide by heating above a dissociation temperature in the range of from about 50° to 220° C.

12. The recording composition of claim 11, wherein said complexing agent is a compound selected from the amines listed in Table IV of the specification.

13. The recording composition of claim 1, wherein said chromogenic compound is Crystal Violet Lactone and said complex is selected from the group consisting of complexes listed in Table V of the specification.

* * * * *